Aug. 18, 1931.　　　C. KING　　　1,819,180
SEED GATHERING ATTACHMENT FOR MOWING MACHINES
Filed Nov. 14, 1929　　　2 Sheets-Sheet 1
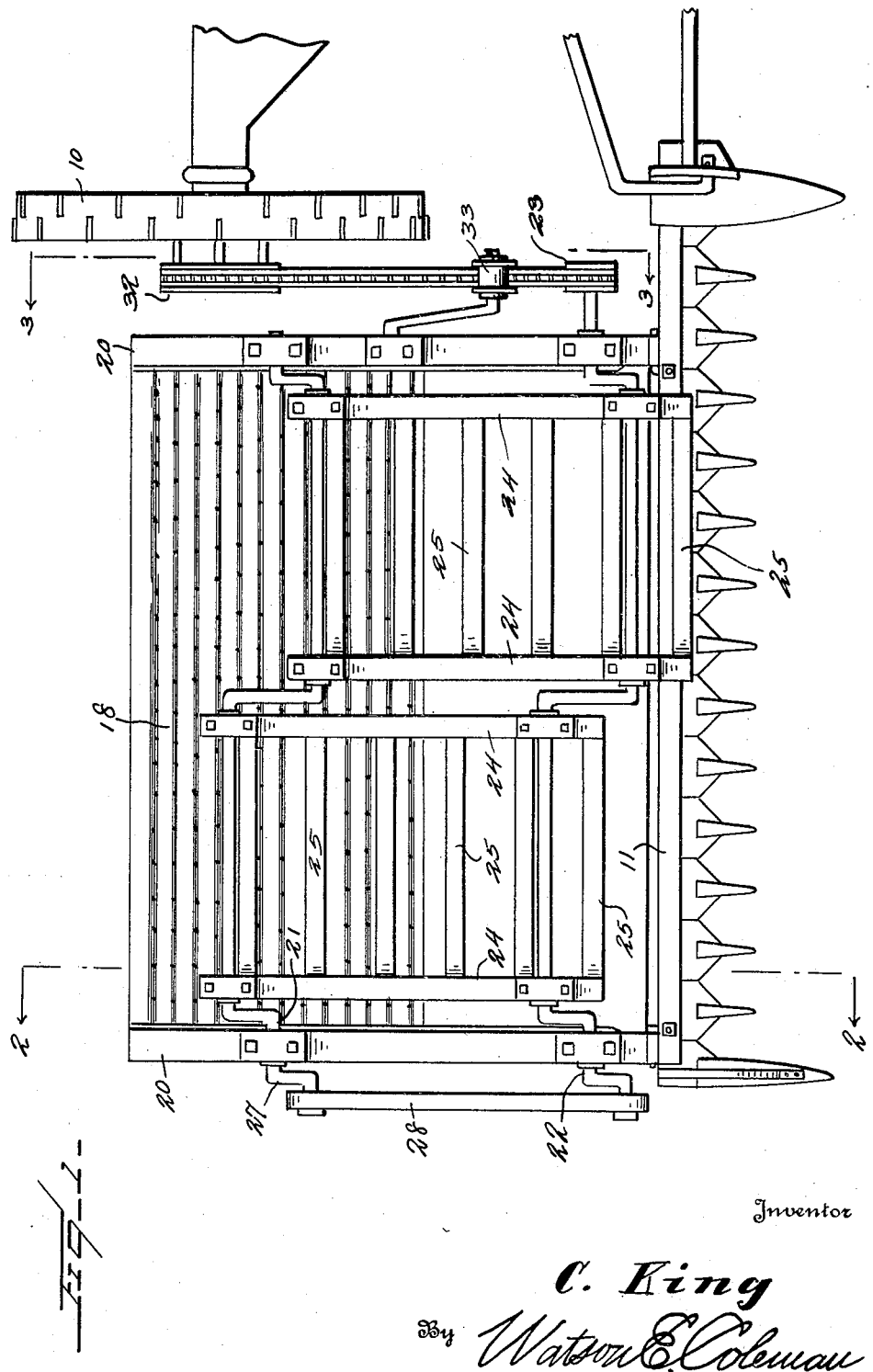
Inventor
C. King
By Watson E. Coleman
Attorney

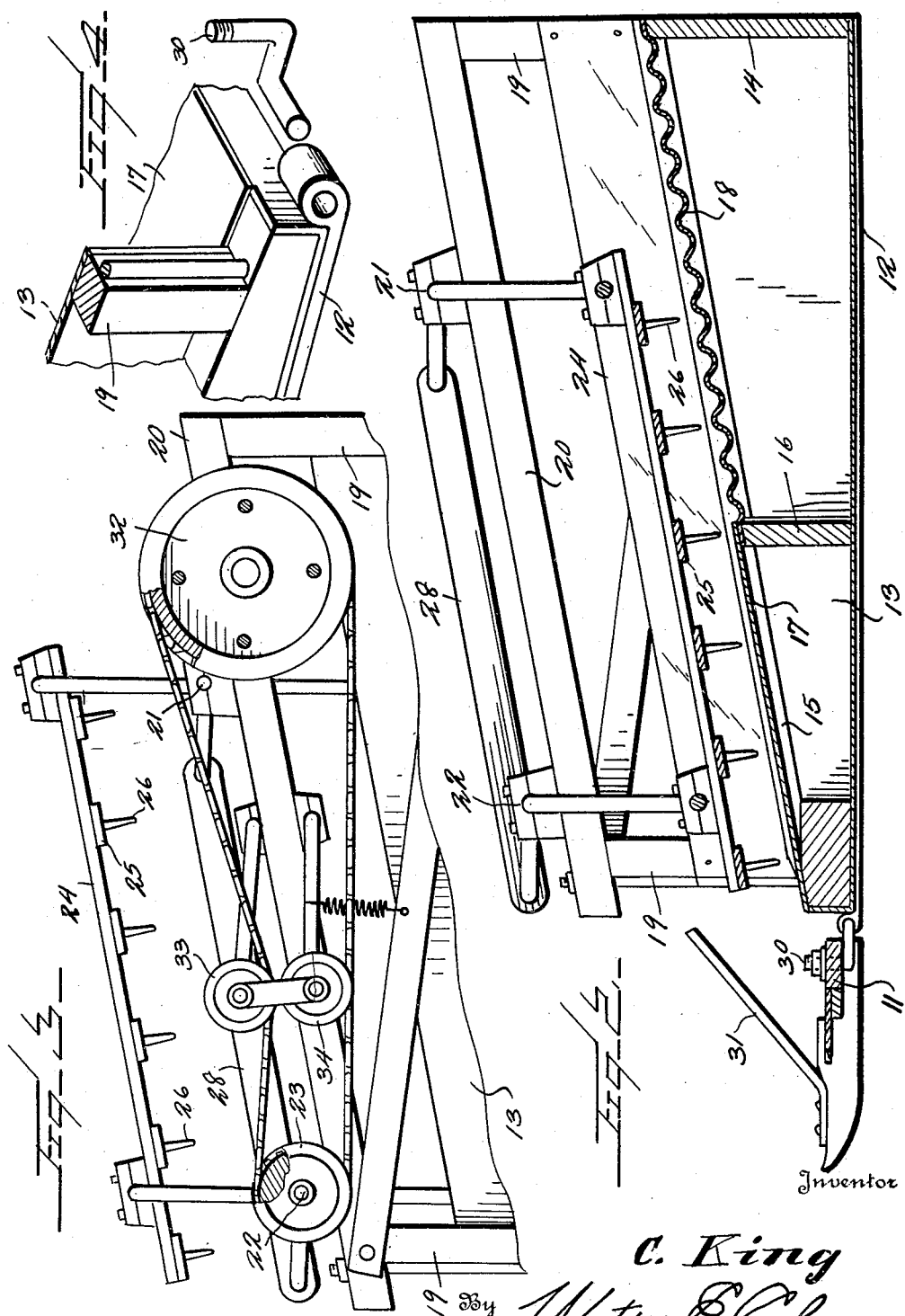

Patented Aug. 18, 1931

1,819,180

UNITED STATES PATENT OFFICE

CURRIE KING, OF RUTHERFORD, TENNESSEE

SEED GATHERING ATTACHMENT FOR MOWING MACHINE

Application filed November 14, 1929. Serial No. 407,189.

This invention relates to devices for gathering seeds when a crop is being cut and particularly to machines of that class in which a beater and seed gathering pan is located behind the cutter bar of a mowing machine or like harvester, the beater acting to cause the crop to shed its seed, these seed being discharged into the pan, the attachment being particularly adapted for gathering the seed of Japanese clover.

One of the objects of the present invention is to provide a seed gathering structure of this character which is adapted to be connected to the cutter bar of a mowing machine for independent rising and falling movement behind the cutter bar and a further object is to provide a construction of this character having a plurality of beaters mounted upon reverse cranks and operating at a relatively high speed to thoroughly beat the grass, grain or other crop which has been cut by the mower bar to detach the seed therefrom and cause the seed to fall into the pan.

A further object is to provide a device of this character which may be used as a tedder after the crop has been cut and is lying on the ground, the action of the beaters, not only acting to beat the seed from the hay, but causing the hay to move backward over the perforated surface of the top of the pan.

A further object is to provide an attachment of this character which is particularly successful in operating where hay is rank and high, this being secured by providing heaters mounted upon reverse cranks, which beaters move from a relatively elevated position to their lowered position and when in an elevated position will be at such height as to pass over the tops of the relatively rank grass.

Another object is to provide a construction of this kind which is operated by a driving wheel connected to the mower, this driving wheel being of relatively large diameter in comparison with the driven wheel on the attachment whereby to cause a very rapid movement of the beaters relative to the driving wheel.

A further object is to provide a device of this character which can be used in connection with the cutter bar when the cutter bar is disposed at any desired angle, thus making it practicable to save the seed even when the ground is uneven.

Other objects will appear in the course of the following description.

My invention is illustrated in the accompanying drawings, wherein:—

Figure 1 is a top plan view of my attachment, the figure showing a portion of the mowing machine;

Figure 2 is a longitudinal section on the line 2—2 of Figure 1;

Figure 3 is a fragmentary section on the line 3—3 of Figure 1;

Figure 4 is a detailed perspective view showing the means for connecting the attachment to a knife bar.

In the drawings, I have illustrated a portion of a mowing machine which includes the traction wheel 10 and the usual cutter bar 11. My seed gathering device is adapted to be disposed immediately behind the cutter bar and have the same length as the cutter bar and to be connected to this cutter bar and to be driven from traction wheel 10. To this end my attachment comprises a supporting frame having a bottom 12, the side walls 13 and a rear wall 14. The bottom 12 preferably consists of sheet metal, though I do not wish to be limited to this and this supporting frame with its side walls, bottom wall and rear wall constitutes a grain collecting pan. Cleats 15 are disposed against the side walls which side walls are preferably lined with sheet metal, and extending transversely of the pan is a supporting bar 16. It will be seen that the forward end of the pan is relatively low while the rear end of the pan is relatively high.

Disposed upon the cleats 15 and the cross bar 16 is the top of the grain pan which is preferably formed in two sections 17 and 18, the section 17 extending inward from the front of the pan and being imperforate, the section 18 being transversely corrugated and perforated with a large number of holes and underlapping the section 17 at its rear edge.

The sections of the top may be held in place upon the pan in any suitable manner.

Extending upward from the front and rear ends of the side walls are the posts 19 suitably braced and supported and the longitudinal elements 20 mounted upon the posts. Mounted in bearings upon the elements 20 is a double crank shaft 21, the cranks being reversely disposed with relation to each other. In the illustration shown, there are two cranks but I do not wish to be limited to this. Mounted in bearings at the forward end of the machine is a duplicate crank shaft 22 of the same character as the crank shaft 21 but carrying upon one end a sprocket wheel 23 whereby the cranks are driven.

Disposed upon these crank shafts are the beater sections, each section comprising longitudinally extending members 24 having bearings through which the cranks 21 and 22 pass, these longitudinal members being connected by cross bars 25. These cross bars are disposed relatively close to each other and may be provided with downwardly extending spikes 26, these spikes being disposed relatively close to each other. It will be obvious now that as the shaft 22 is revolved, the two beaters will act as connecting rods between the crank shaft 22 and the crank shaft 21 and the two beaters will be given a circular motion in opposite directions. The extremities of the crank shafts 21 and 22 at their ends remote from the mowing machine are provided with cranks 27 connected by a connecting rod 28.

The frame of this seed gatherer has a length nearly equal to that of the cutter bar 11, the outer end of the frame being disposed approximately coincident with the outer end of the cutter bar, the inner end of the bar, however, being disposed inward of the inner end of the cutter bar to an extent equal to about three fingers of the cutter bar so as to permit the cutter bar to be tipped or canted to pass over uneven ground. Preferably the outer end of the frame of the beater is provided with a separator 31 extending forward of the cutter bar. The bottom of the attachment is connected to the cutter bar by hinged connections. To this end, the forward end of the frame is provided with bolts having upwardly extending portions 30, the knife bar of the cutter bar being apertured for the passage of these bolts. The bolts pass through the apertures in the cutter bar and then nuts engage with these hinge bolts. This permits the frame of the attachment to be raised or lowered at its rear end and to travel over and ride upon uneven ground.

As before remarked, the beaters are driven by means of the sprocket wheel 23. This sprocket wheel in turn is driven from a sprocket wheel 32 mounted upon and rotatable with the traction wheel 10 of the mowing machine. The sprocket wheel 32 is preferably approximately 14 inches in diameter while the sprocket wheel 23 is approximately five inches in diameter, thus securing approximately five rotations of the rotary beaters or drags while the mower traction wheel turns over once. Thus the beaters catch the hay five times while the hay is on the pan, thus threshing out the seed. For the purpose of taking up the slack on the sprocket chain connecting the driving and driven sprocket wheels, I provide an idler. This idler comprises a double roller consisting of the two rollers 33 and 34, the driving sprocket chain, running between these two rollers. The bottom roller holds the flights of the chain apart so as to keep the chain from locking when slackened. This is particularly necessary because on uneven ground over which the mower machine is operating, the sprocket chain becomes alternately taut and slack and the mower blade raises and lowers.

This double roller idler takes up said slack of chain and does not let the chain lock as it otherwise would be likely to do.

It will be seen that I have done away with the use of endless chains or an endless carrier and particularly the use of two endless carriers between which the hay is to pass as in constructions of this character, the hay is very liable to pass over the top of the upper endless carrier particularly where the grass is rank and high. I have provided what may be termed a rotary drag or beater in two sections, one of which is raised when the other is lowered, one of these sections constantly moving forward and then downward to engage the hay while the other section is moving rearward and then upward. Thus the hay is constantly agitated and the seed beaten therefrom at all times.

By providing these beaters mounted upon relatively long cranks, the beaters will pass over the top of long grass and drag grass down toward and against the perforated top plate and cause the beating out and discharge of all seed. It will be seen that on my machine the crank shaft only extends the length of the mower blade, thus reducing its weight and rendering it less cumbersome. Furthermore, it will be noted that the strips or cross bars which carry the teeth and which constitute beaters extend transversely of the movement of the cranks so as to secure a very thorough beating action upon the hay.

Another advantage of my machine resides in the fact that after the hay has been cut and cured, this device may be run under the hay as a tedder causing the hay to pass over the attachment and saving the seed when cured out.

Furthermore, this device can be used with the mower blade at any angle and thus be used on uneven ground. The attachment can be readily disconnected by removing the two bolts in the cutter bar and slipping the driving chain off the sprockets. This requires only two minutes time. The machine weighs approximately 75 pounds and can be easily transported from one place to another.

While I have illustrated a form of machine which has been found to be extremely practical and effective, I do not wish to be limited thereto as it is obvious that many minor changes can be made therein without departing from the spirit of the invention as defined in the appended claims.

I claim:—

1. A seed gathering attachment for mowing machines comprising a supporting frame having side walls and having means whereby it may be hingedly connected to the cutter bar of a mowing machine, the frame being formed to provide a seed collecting pan, a perforated cover for the pan extending upward and rearward, crank shafts mounted upon the side walls, longitudinal members connecting the cranks of one crank shaft to the cranks of the other shaft, transverse spike carrying members mounted upon the longitudinal members, and means for driving said crank shafts from the mowing machine.

2. In a seed gatherer of the character described, a supporting frame having a seed gathering pan, a plurality of crank shafts extending across the frame, each crank shaft having a plurality of cranks, certain of the cranks extending in opposite directions to certain of the other cranks, beater frames mounted upon said cranks and including transversely extending cross bars, and means for driving said crank shafts from the mowing machine, said means including a sprocket wheel attached to one of said crank shafts, a sprocket chain passing over the sprocket wheel, and an idler keeping the sprocket chain taut and preventing interlocking between the upper and lower flights of the sprocket chain.

3. In a seed gatherer of the character described, a supporting frame having a seed gathering pan and a top for said pan formed in two sections, the forward section being imperforate and the rear section being perforated and corrugated parallel to the front and rear of the pan, and beaters moving upward and rearward across the pan.

In testimony whereof I hereunto affix my signature.

CURRIE KING.